(No Model.)

G. W. & S. TAYLOR.
CULTIVATOR.

No. 293,920. Patented Feb. 19, 1884.

Witnesses.
L. F. Gardner
J. W. Garner

Inventors
G. W. Taylor
Saml. Taylor
per F. A. Lehmann,
atty.

UNITED STATES PATENT OFFICE.

GEORGE W. TAYLOR AND SAMUEL TAYLOR, OF SMYRNA, DELAWARE.

CULTIVATOR.

SPECIFICATION forming part of Letters Patent No. 293,920, dated February 19, 1884.

Application filed December 14, 1883. (No model.)

*To all whom it may concern:*

Be it known that we, GEORGE W. TAYLOR and SAMUEL TAYLOR, of Smyrna, in the county of Kent and State of Delaware, have invented certain new and useful Improvements in Cultivators; and we do hereby declare the following to be a full, clear, and exact description of the invention, such as will enable others skilled in the art to which it pertains to make and use it, reference being had to the accompanying drawings, which form part of this specification.

Our invention relates to an improvement in cultivators; and it consists, first, in combination with the cultivator, of a pivoted presser-plate, and a spring which is applied thereto for the purpose of giving the necessary pressure upon the ridge of earth that is thrown up by the covering-blades of the cultivator; second, in the construction and arrangement of parts which will be more fully described hereinafter.

Figure 1:
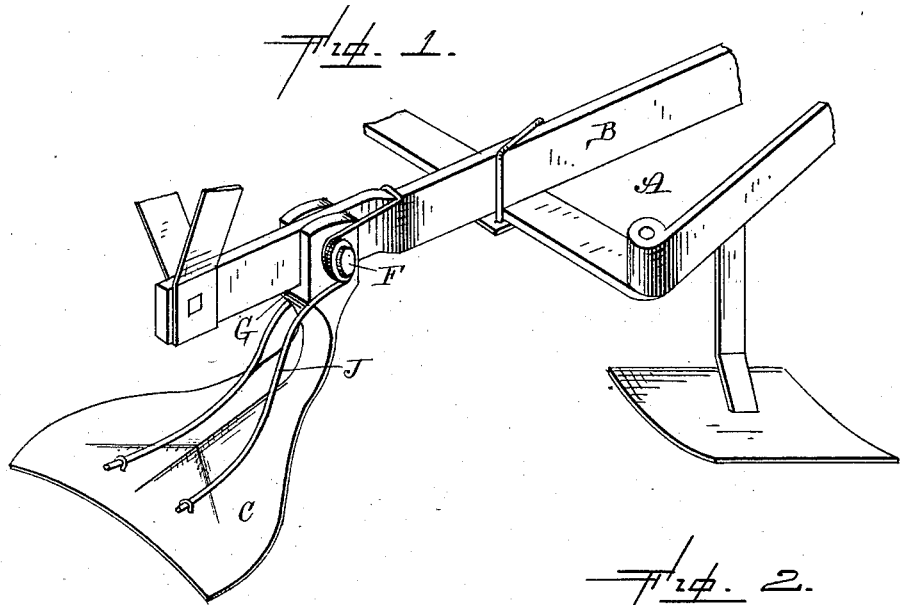
Figure 3:
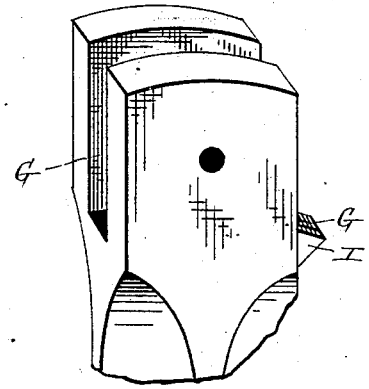
Figure 2:
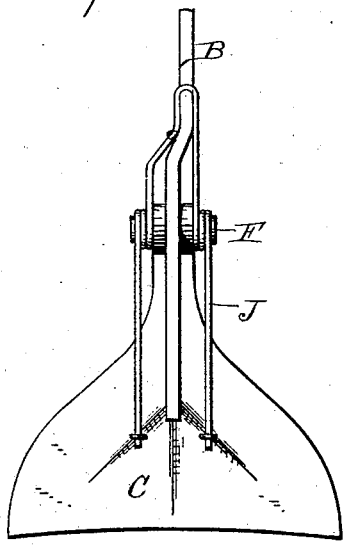

Figure 1 is a perspective of a presser-plate embodying our invention, and shown attached to the cultivator frame. Fig. 2 is a plan view of the same. Fig. 3 is an enlarged perspective of the upper portion of the presser-plate.

A represents a portion of a frame of an ordinary cultivator, the middle beam, B, of which is made longer than the side beams, so as to project beyond the rear end of the cultivator. Pivoted to this extension of the middle beam is the presser-plate C, which will preferably be made of the shape shown. This plate, including its standard, is made of cast-iron, but has the under surface of the plate smoothed and chilled, so as to give the plate a greater durability. This plate will be made of suitable width, and will be slightly concave on its under side, so as to press down and smooth over the ridge which has been cast up by the hilling-wings or covering-blades of the cultivator. The upper portion or standard of this blade is notched or recessed, as shown, so as to catch over opposite sides of the central beam, and through this upper portion and the beam is passed the pivotal bolt F. The bottom of the recess C, which is made in the top of this upper portion of the blade, forms two inclined surfaces, and upon the front side of this upper portion is formed a projection or lug, I, the top surface of which forms an extension of one of the inclined surfaces. This lug is formed for the purpose of catching against the under side of the beam, and forming a stop for the purpose of regulating the distance the blade shall be forced downward by the spring J. The second inclined surface forms a second stop, for the purpose of preventing the blade from being raised upward too high in case any obstruction should be encountered. In order to keep this presser-plate pressed downward and make it flexible with a uniform pressure upon the top of the ridge, the spring J is applied to the plate, as shown. This spring will be made of any suitable material, and applied in the usual manner.

In order to prevent the ends of the spring from becoming detached from the plate, or getting out of place, suitable small staples are passed through or fastened to the plate in any suitable manner, and the ends of the spring are made to catch under the staples, as shown.

We do not limit ourselves to the precise form of the spring shown, for a spring of a different shape may be employed.

This covering-plate, when in use, can rock upon its pivotal bolt, and thus accommodate itself to any unevenness in the ridges. When the ridge is unusually large, the plate will be raised upward against the pressure of the spring until the rear incline strikes against the under side of the beam, and when depressions or smaller ridges are encountered, the plate will sink downward until the lug I strikes against the under side of the beam, and thus prevents it from moving any farther.

Having thus described our invention, we claim—

1. The combination of the beam of a cultivator with a presser-plate having a recess in its top, so as to catch over the beam, a pivotal bolt, and a spring for keeping the presser-plate pressed downward, substantially as described.

2. The combination of the presser-plate having a recess in its upper portion, and provided with the inclined surfaces at the bottom of the recess, and the lug I, with the pivotal bolt, the beam of the cultivator, and the spring which is applied to the beam and the plate, substantially as described.

3. The combination of the presser-plate having a recess in its upper end, and provided with the lug I, with the pivotal bolt, the spring which is applied to both the beam and the plate, and the staples which are secured to the plate for holding the ends of the spring in position, substantially as specified.

In testimony whereof we affix our signatures in presence of two witnesses.

GEO. W. TAYLOR.
    SAMUEL TAYLOR.

Witnesses:
 GOVE S. WILSON,
 HENRY C. SPRUANCE.